United States Patent
Cho et al.

(10) Patent No.: US 8,467,833 B2
(45) Date of Patent: Jun. 18, 2013

(54) MOBILE TERMINAL

(75) Inventors: Choong-Hyoun Cho, Seoul (KR); Won-Seok Joo, Seoul (KR)

(73) Assignee: LG Electronics Inc., Seoul (KR)

(*) Notice: Subject to any disclaimer, the term of this patent is extended or adjusted under 35 U.S.C. 154(b) by 518 days.

(21) Appl. No.: 12/337,153

(22) Filed: Dec. 17, 2008

(65) Prior Publication Data

US 2009/0156264 A1    Jun. 18, 2009

(30) Foreign Application Priority Data

Dec. 17, 2007  (KR) .................. 10-2007-0132553

(51) Int. Cl.
*H04M 1/00*    (2006.01)

(52) U.S. Cl.
USPC ............ 455/566; 455/575.4; 455/575.1; 455/550.1; 455/556.2; 455/90.3

(58) Field of Classification Search
USPC ............ 455/550.1, 575.2, 575.3, 575.4, 566, 455/90.3; 345/156, 169
See application file for complete search history.

(56) References Cited

U.S. PATENT DOCUMENTS

| | | | | |
|---|---|---|---|---|
| 7,388,578 B2* | 6/2008 | Tao | ................................ | 345/173 |
| 7,532,169 B2* | 5/2009 | Joo et al. | ....................... | 343/702 |
| 7,570,922 B2* | 8/2009 | Williams | .................. | 455/67.11 |
| 7,587,225 B2* | 9/2009 | Kim et al. | ................... | 455/575.1 |
| 8,032,178 B2* | 10/2011 | Choi et al. | ................. | 455/556.1 |
| 8,077,854 B2* | 12/2011 | Ou et al. | ....................... | 379/330 |
| 8,116,834 B2* | 2/2012 | Jang et al. | ................. | 455/575.4 |
| 8,159,592 B2* | 4/2012 | Joo et al. | ..................... | 348/333.06 |
| 8,165,647 B2* | 4/2012 | Cho et al. | .................... | 455/575.3 |
| 8,238,978 B2* | 8/2012 | Taniguchi et al. | ............. | 455/566 |
| 8,326,383 B1* | 12/2012 | Patel et al. | ................. | 455/575.4 |
| 2002/0068619 A1* | 6/2002 | Nagai | ........................... | 455/575 |
| 2008/0039155 A1* | 2/2008 | Kim | ............................ | 455/575.1 |
| 2008/0051164 A1* | 2/2008 | Joo et al. | .................... | 455/575.4 |
| 2008/0076493 A1* | 3/2008 | Seo et al. | ................... | 455/575.4 |

* cited by examiner

*Primary Examiner* — Sharad Rampuria
(74) *Attorney, Agent, or Firm* — Birch, Stewart, Kolasch & Birch, LLP (57) ABSTRACT

A mobile terminal is provided that includes a first body, a display having a first region and a second region, the display being located at the first body, a second body slidably connected to the first body, the second body being slideable between a first position that covers the second region and a second position that exposes the second region, and a controller configured to control the display unit such that the display unit outputs different screens when the second body is in the first position and in the second position.

18 Claims, 8 Drawing Sheets

MOBILE TERMINAL

CROSS-REFERENCE TO RELATED APPLICATIONS

This application claims priority to Korean Application No. 10-2007-0132553, filed on Dec. 17, 2007, which is herein expressly incorporated by reference in its entirety.

BACKGROUND OF THE INVENTION

1. Field of the Invention

The present invention relates generally to a mobile terminal, and more particularly, to a mobile having a second body that is moveable with respect to a first body to expose a region of a display unit.

2. Description of Related Art

A mobile terminal refers generally to a portable device that is configured to provide one or more functions, such as audio/video communication functions, information input/output functions, data storage functions, and the like.

The mobile terminal has been adapted over time to be able to perform a variety of additional functions including capturing images in the form of photos or videos, playing multimedia files such as music files or video files, playing games, and receiving broadcasts, in addition to the traditional functions described above, and, therefore, the mobile terminal has been implemented as a complex multimedia player. In order to implement these additional functions, a variety approaches using different hardware and/or software have been attempted. For example, in order for users to search or select functions easily, a user interface (UI) environment has been provided.

Also, because one's choice in mobile terminals is considered to be representative of one's character or personality, there is a demand for various types of mobile terminals. In accordance with such demands, various types of mobile terminals including a folder type, a slide type, a bar type, and a rotation type, have been developed. Among the various designs, the slide type mobile terminal generally has an opening and closing structure in which one body overlays another body and the bodies are slidable with respect to each other.

BRIEF SUMMARY OF THE INVENTION

It is an object of the present invention to provide a mobile terminal which can improve the size of a display unit in a limited mounting space and to provide a new opening and closing structure.

To achieve the foregoing object, there is provided a mobile terminal according to the present invention, the mobile terminal including a first body, a display having a first region and a second region, the display being located at the first body, a second body slidably connected to the first body, the second body being slideable between a first position that covers the second region and a second position that exposes the second region, and a controller configured to control the display unit such that the display unit outputs different screens when the second body is in the first position and in the second position.

In another aspect, the second body may be configured to cover one end of the first body.

In a different aspect, the second body may include a front case located at the front surface of the first body so as to cover the second region when the second body is in the first position, and a rear case located at the rear surface of the first body, the rear case being connected to the front case.

In still another aspect, the mobile terminal may include a guide unit configured to guide relative movement of the first and second bodies so as to constrain lateral movement between the first and second bodies during said relative movement of the first and second bodies.

In another aspect, the display unit may be configured to display a first output screen in the first region when the second region is covered and display a second output screen in the first and second regions when the second region is uncovered.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Hereinafter, a mobile terminal related to the present invention will be described in more detail with reference to the accompanying drawings.

Figure 1:
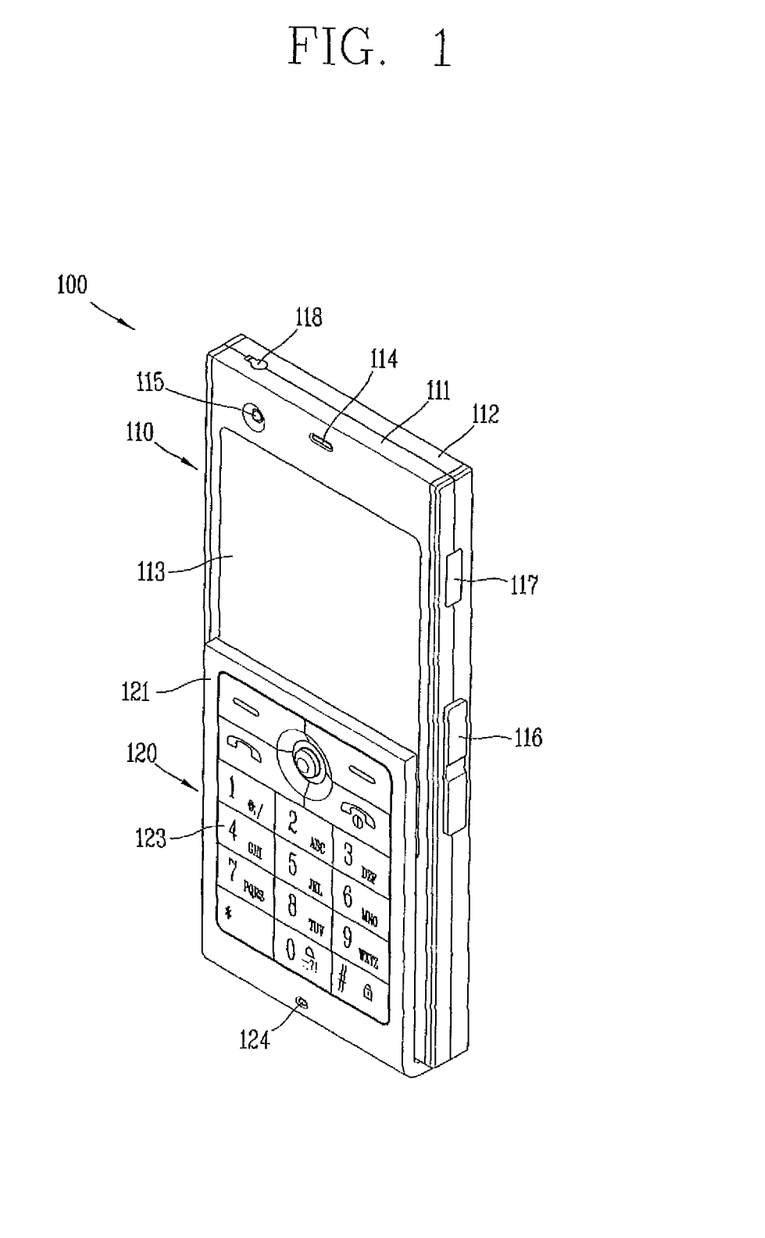
FIGS. 1 and 2 are front perspective views of a mobile terminal according to an exemplary embodiment of the present invention.
Figure 2:
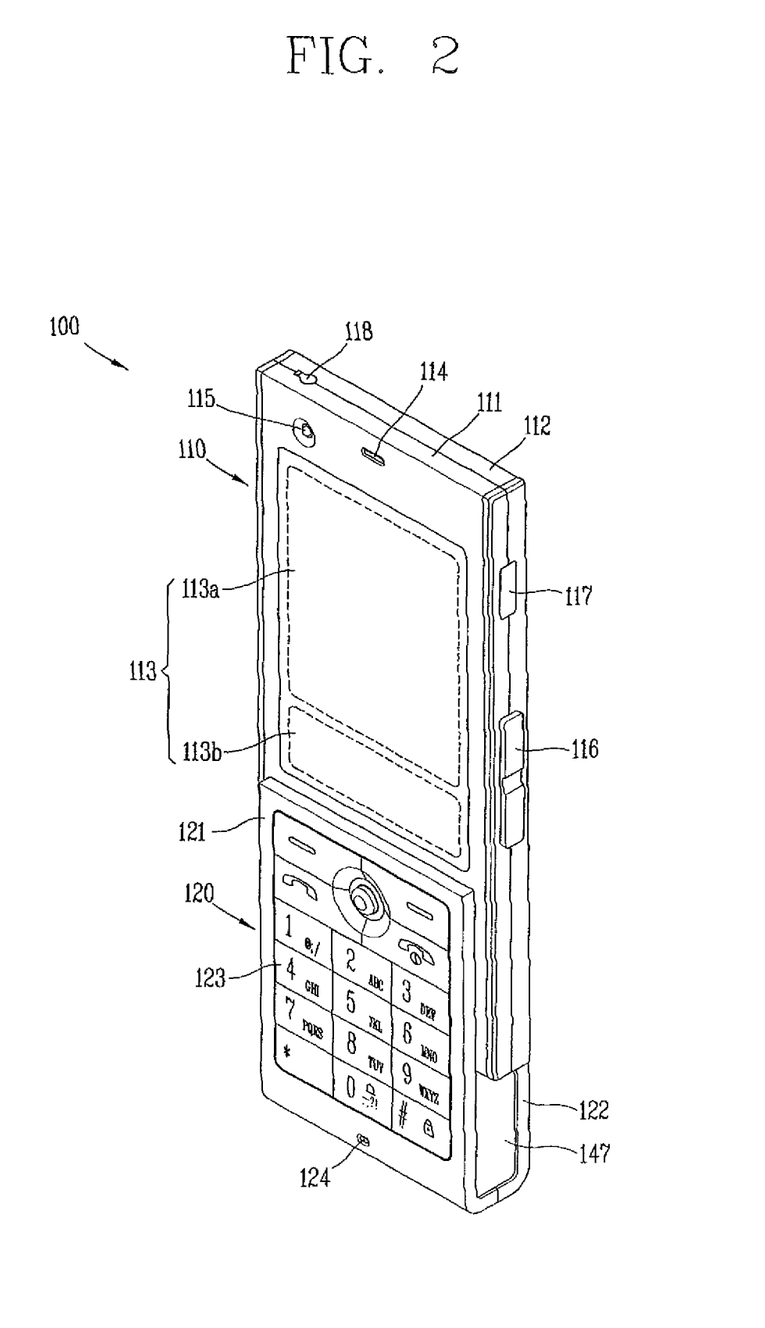

As seen in FIGS. 1 and 2, a mobile terminal 100 according to the exemplary embodiment of the present invention includes a first body 110 and a second body 120 slidably connected to the first body 110 along at least one direction. The first body 110 includes a display unit 113, and the second body 120 is configured to cover one end of the first body 110 and to cover and uncover a region of the display unit 113 when the second body 120 is moved between a first position and a second position. In particular, when a region of the display unit 113 is covered by the second body 120, as shown in FIG. 1, the mobile terminal 100 is in a closed configuration. When a region of the display unit 113 is exposed by the movement of the second body 120, as shown in FIG. 2, the mobile terminal is in an open configuration.

A case, which may also be referred to as a casing, a housing, or a cover, forming an external appearance of the first body 110 includes a front case 111 and a rear case 112. A variety of electronic components for providing the various functions of the mobile terminal are provided within a space formed by the front case 111 and the rear case 112. The front case 111 and rear case 112 may be formed by injecting synthetic resin or using metal material, such as STS (Stainless Steel) or titanium (Ti), in addition to other conventional materials.

A first sound output unit 114 and a first image input unit 115 may be located in the first body 110, in particular, the front case 111. The audio output unit 114 may be implemented as a receiver or a speaker. The first image input unit 115 may be implemented in the form of a camera module for capturing an image or video of the user or some other subject.

As noted above, the display unit 113 is provided at the first body 110. The display unit 113 may be a Liquid Crystal Display (LCD) module, an Organic Light Emitting Diode (OLED) module, or the like, for visually displaying information. The display unlit 113 may further include a touch screen to allow inputting of information in a touch manner by the user. As seen in FIG. 2, the display unit 113 may include a first region 113a disposed to be exposed regardless of the position of the second body 120, and a second region 113b that is covered and uncovered by movement of the second body 120. As shown in FIG. 2, the second region 113b extends from the first region 113a, but it may be provided separate from the first region 113a.

A first manipulation unit 116 and an interface 117 may also be disposed on at least one of the front case 111 and the rear case 112 of the first body 110. The first manipulation unit 116 may be configured to receive commands for controlling an operation of the mobile terminal 100. The interface 117 may be used as a connector to allow the mobile terminal 100 to exchange data with an external device or to be powered by an external power source. For example, the interface 117 may be at least one of a connection port to be connected with an earphone through a fixed line or wirelessly, a port for short range communication (e.g., an IrDA port, a wireless LAN port, or the like), and a power supply port for supplying power to the mobile terminal 100. Alternatively, the interface 117 may be a card socket for receiving/accommodating an external card such as a Subscriber Identification Module (SIM), a User Identity Module (UIM), a memory card for storing information, or the like.

In addition to an antenna used for call communication (not shown), a broadcast signal reception antenna 118 may be disposed at one side of the first body 110. The antenna 118 may be installed such that it can be drawn from the first body 110.

The second body 120 is configured to cover the front case 111 and the rear case 112 of the first body 110. For example, the second body 120 may be configured to cover a portion of the front, rear, and bottom surfaces of the first body 110 and to expose the pair of side surface of the first body 110. To this end, the second body 120 may be formed in a 'U' shape and be connected to cover a lower end of the first body 110, and the second body 120 may be configured to slide in a longitudinal direction of the first body 110. In this exemplary embodiment, the width of the second body 120 may be smaller than the width of the first body 110.

A second manipulation unit 123 may be disposed on the second body 120. The first and second manipulation units 116 and 123 may be generally referred to as a manipulating portion, and any means can be employed as the manipulation units so long as they can be operated in a touch manner. For example, the manipulation units may be implemented as a dome switch, a wheel or jog type for rotating a key, a joystick, or a touch screen or a touch pad that can receive a command or information according to touch manipulation by the user. In terms of function, the first manipulation unit 116 may be operated as a hot key for performing a special function such as activating the first image input unit 15, and the second manipulation unit 23 may be used to input a command such as start, end, scroll, or the like, or to input a number, a character, or a symbol.

An audio input unit 124 may be located on the second body 120. The audio input unit 124 may be implemented in the form of a microphone, for example, to receive a voice of the user or other sounds from the surrounding environment.

Figure 3:
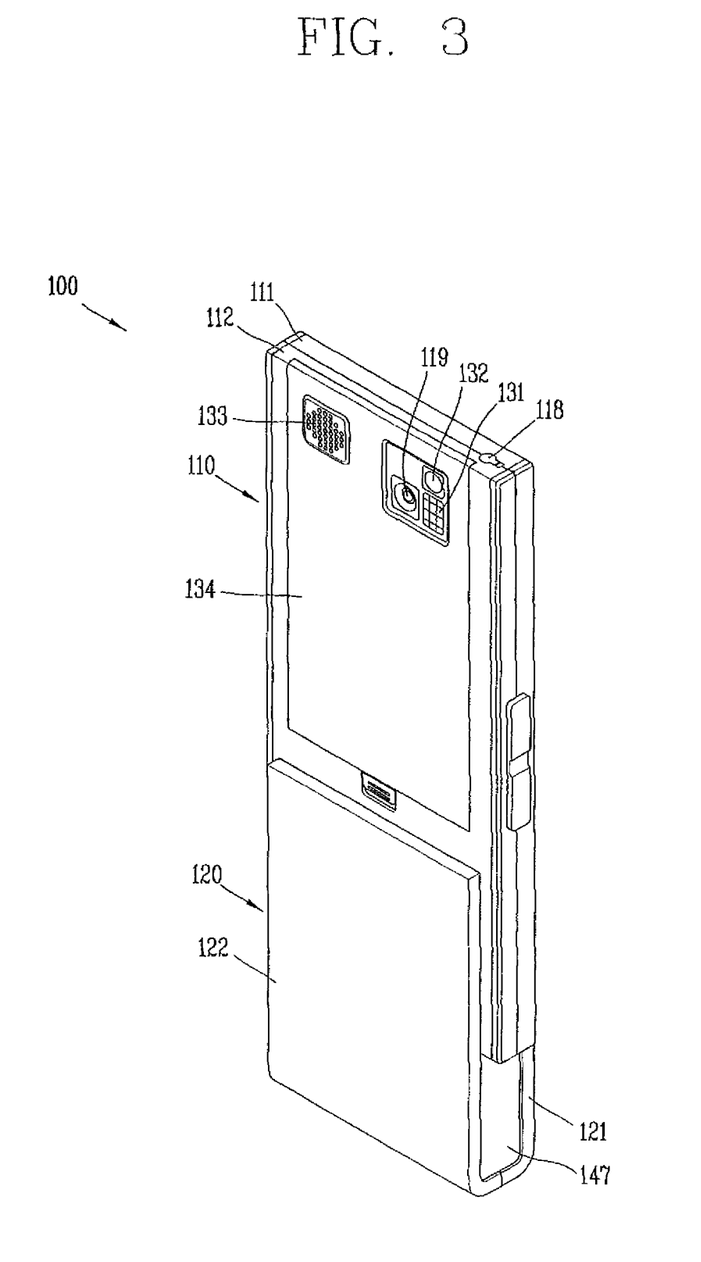
FIG. 3 is a rear perspective view of the mobile terminal shown in FIG. 2.

As shown in FIG. 3, a second image input unit 119 may be located on a rear surface of the rear case 112 of the first body 110. The second image input unit 119 may be a camera module that has an image capture direction that is substantially the opposite to that of the first image input unit 115 (see FIG. 1) and may have a different number of pixels from that of the first image input unit 115. For example, the first image input unit 115 may have a relatively lower resolution to capture the user's face and transmit the same to another party during video call communication or the like, while the second image input unit 119 may have a relatively higher resolution to capture a general subject where the images typically do not need to be transmitted immediately.

A flash 131 and a mirror unit 132 are disposed adjacent to the second image input unit 119. When an image of the subject is captured with the second image input unit 119, the flash 131 illuminates the subject. The mirror unit 132 allows the user to see himself when he wants to capture his own image (self-image capturing) by using the second image input unit 119.

A second audio output unit 133 may be disposed on the rear case 112 of the first body 110. The second audio output unit 133 may implement a stereophonic function in conjunction with the first audio output unit (114 in FIG. 1), and may be also used during a call in a speaker phone mode.

A battery cover 134 for covering a battery mounted in the first body 110 may be provided at the rear surface of the rear case 112. In this exemplary embodiment, the battery may be detachably mounted to the first body 11 to allow for charging independent of the mobile terminal 100.

Figure 4:
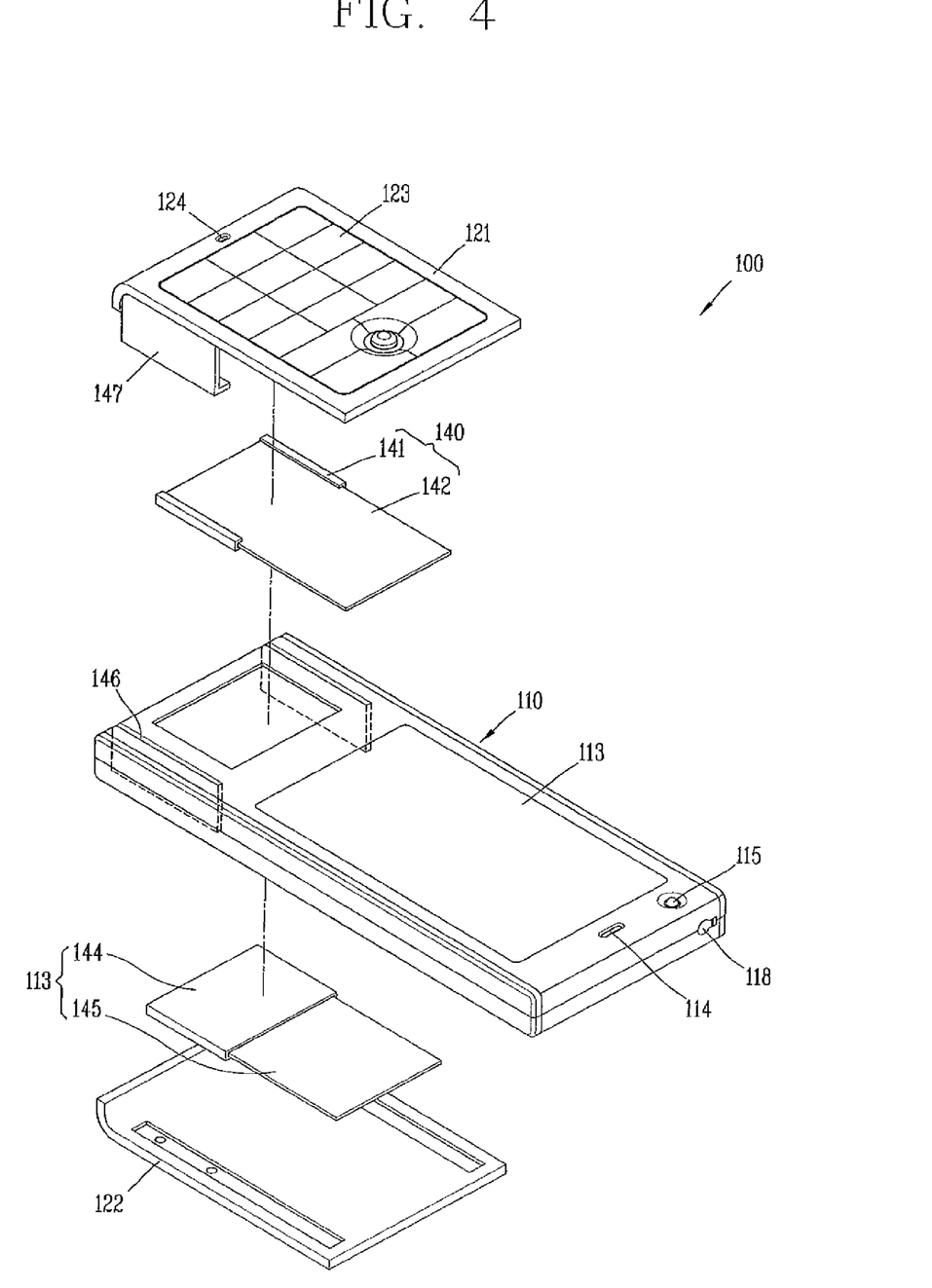
FIG. 4 is an exploded perspective view of the mobile terminal shown in FIGS. 1 to 3.

An exploded perspective view of the second body 120 is shown in FIG. 4. The second body 120 includes a front case 121 and a rear case 122 that are connected to front and rear surfaces of the first body 110, respectively. The front case 121 and rear case 122 may be formed having a plate shape in which their lower ends are curved.

The front case 121 is connected to the first body 110 so as to cover the second region 113b (see FIG. 2) of the display unit 113, and is also connected to the rear case 122 disposed on the rear surface of the first body 110. A first slide module 140 for slidably connecting the front case 121 and the first body 110 is located therebetween. The first slide module 140 may include a first fixed plate 141 and a first moving plate 142. The first fixed plate 141 is fixed to the front surface of the first body 110, and is provided with guide grooves for moving the first moving plate 142. Further, the first moving plate 142 is fixed to the front case 121, and the sides of the first moving plate 142 are inserted into the guide grooves of the first fixed plate 141 and connected thereto so as to be moved in the length direction of the first body 110.

A second slide module 143 is located between the rear case 122 and the first body 110, and, similar to the first slide module 140, the second slide module 143 may include a second fixed plate 144 and a second moving plate 145. The second fixed plate 144 is fixed to the rear surface of the first body 144, and the second moving plate 145 is fixed to the rear case 122. The second moving plate 145 is movably connected to the second fixed plate in a manner similar to that described above for the first moving plate 142.

While the first slide module 140 and the second slide module 143 are provided in this exemplary embodiment, it is understood that only one of the first slide module 140 and the second slide module 143 need be provided. However, it is preferable that the first slide module 140 and the second slide module 143 are provided together in order to more stably slide the first and second bodies 110 and 120 with respect to each other.

An elastic force providing unit (not shown) may be located on at least one of the first and second slide modules 140 and 143. The elastic force providing unit may be configured to provide elastic force to the second body 120 so that the second body 120 can slide semi-automatically when the second body 120 is moved between the open and closed configuration. For example, when the second body 120 is slidably moved by the user a predetermined distance towards or away from the closed configuration, the elastic force providing unit may automatically move the second body 120 the remaining distance by an elastic force provided by the elastic force providing unit. Since the elastic force providing unit may be readily implemented by those skilled in the art, a description of the detailed construction thereof is omitted. One example of an elastic force providing unit is the elastic device 430 set forth in U.S. application Ser. No. 11/649,756, titled "MOBILE TERMINAL;" however, it is understood that other elastic force providing units could be used.

A guide unit 147 configured to assist in relative movement of the first and second bodies 110 and 120 is formed at either the front case 121 or the rear case 122 so as to constrain lateral movement between the first and second bodies 110 and 120 upon relative movement of the first and second bodies 110 and 120. For example, the guide unit 147 may be configured to extend from the front case 121 and be connected to the rear case 122. Alternatively, the guide unit 147 may be configured to extend from the rear case 122 and be connected to the front case 122.

Through slots 146 passing through the first body 110 are formed at a lower end of the first body 110, and the guide unit 147 is configured to be inserted into the through slots 146 and be movable therein. The guide unit 147 may be provided as a pair with one at the left side and the other at the right side of the front case 121. The guide unit 147 may also serve as a fastening portion for connecting the front case 121 to the rear case 122 and may provide an external appearance of the left and right sides of the second body 120 when the mobile terminal 100 is in an open configuration.

Figure 5A:
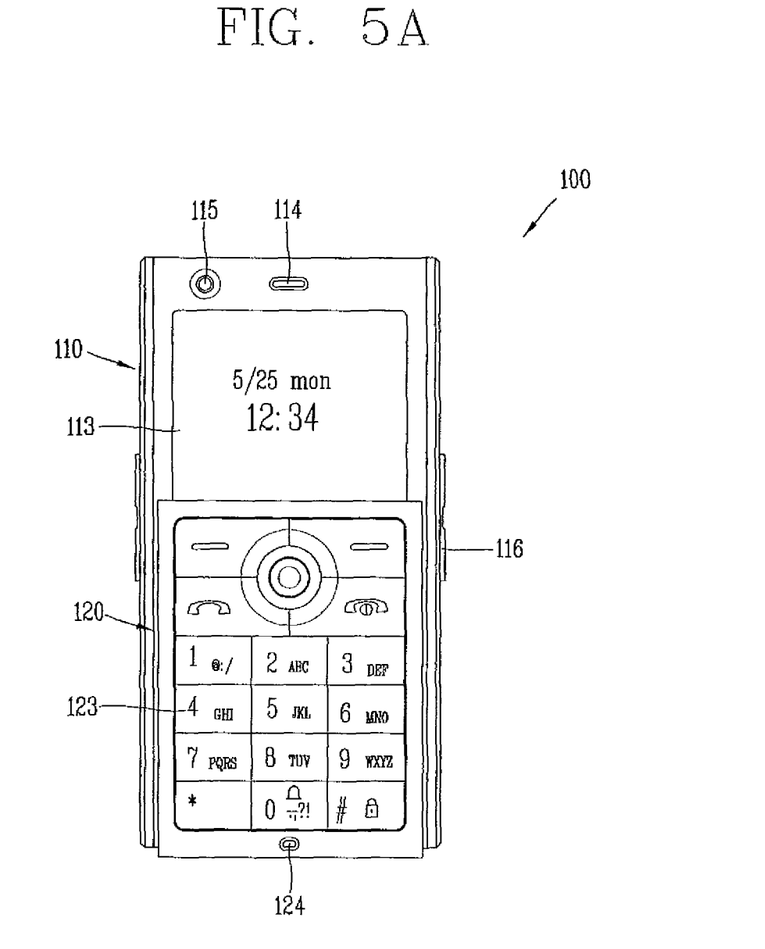
FIGS. 5*a* and 5*b* are front views of the mobile terminal shown in FIG. 1 in a closed configuration.
Figure 5B:
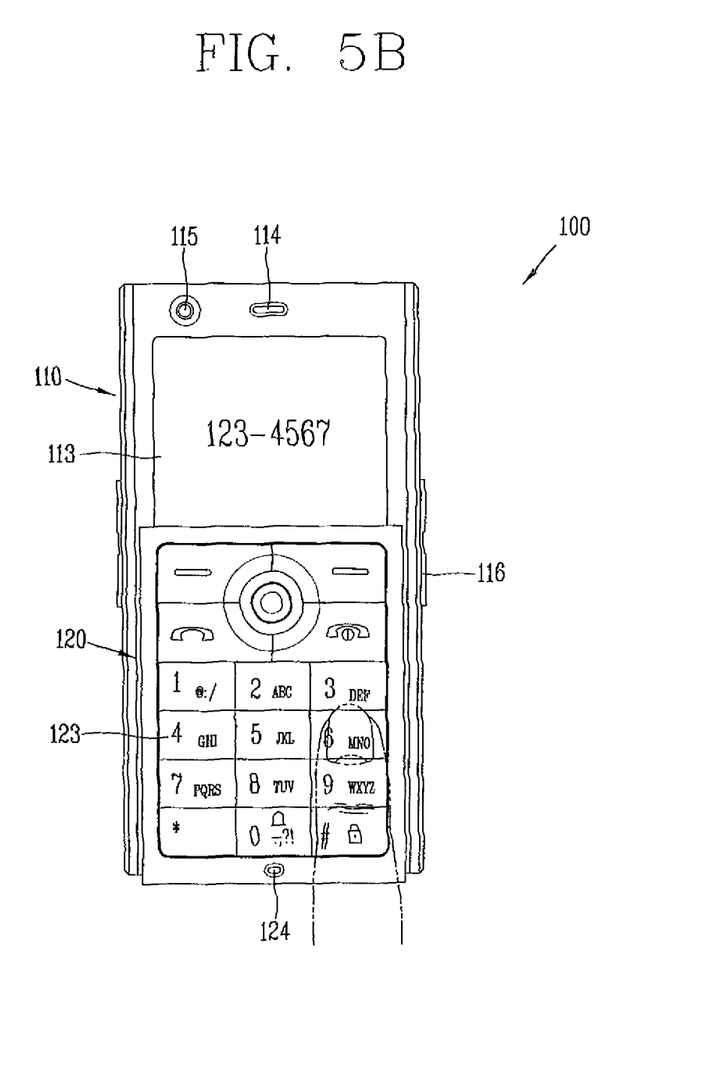
Figure 6A:
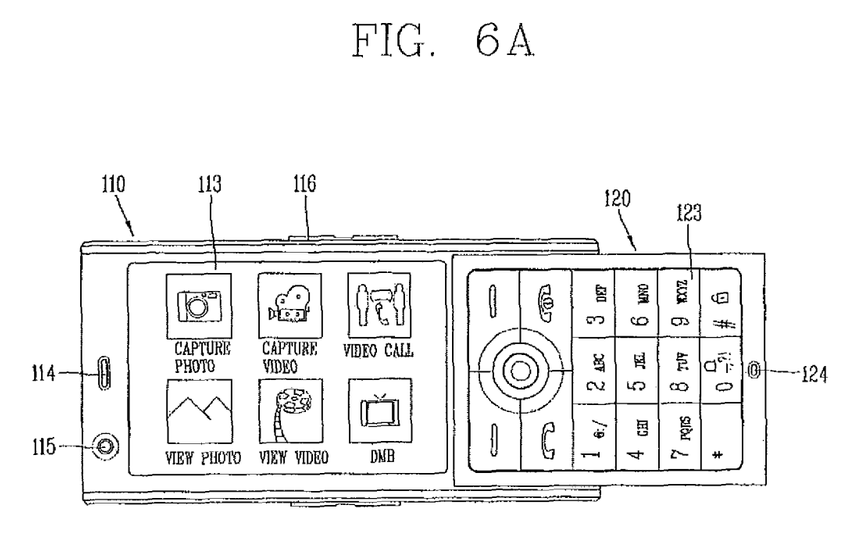
FIGS. 6*a* and 6*b* are front views of the mobile terminal shown in FIG. 1 in an open configuration.
Figure 6B:
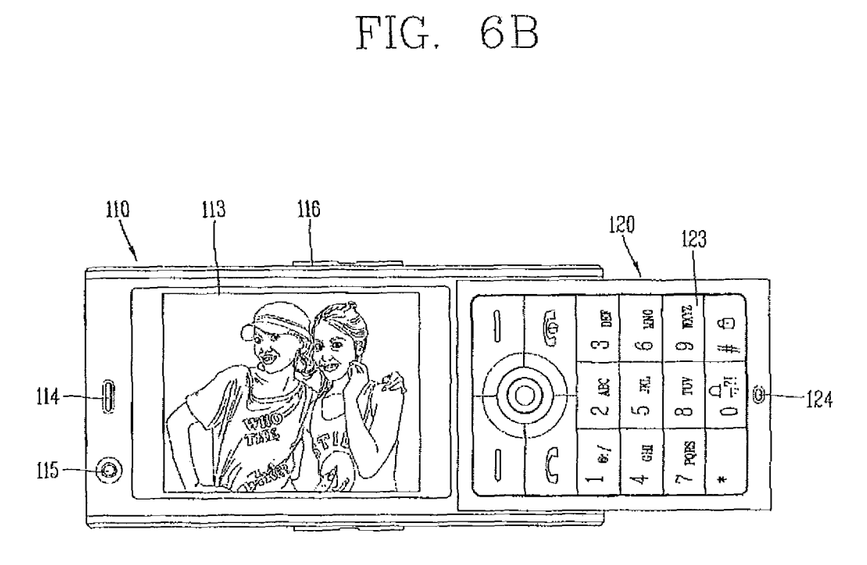

Turning to the display unit 113, FIGS. 5a and 5b are front views of the mobile terminal 100 when the mobile terminal 100 is in a closed configuration, and FIGS. 6a and 6b are front views of the mobile terminal 100 when the mobile terminal 100 is in an open configuration. The display unit 113 disposed at the first body 110 may be configured to display a first output screen in the first region 113a (see FIG. 3) when the mobile terminal 100 is in a closed configuration (see FIGS. 5a and 5b), and to display a second output screen in the first and second regions 113a and 113b (see FIG. 2) when the mobile terminal 100 is in an open configuration (see FIGS. 6a and 6b).

As shown in FIGS. 5a and 5b, the mobile terminal 100 can be operated in the same manner as a bar type mobile terminal when the mobile terminal 100 is in a closed configuration. The user can use the basic functions of the mobile terminal 100, including voice calling and the transmitting/receiving text messages, by using the mobile terminal 100 in the closed configuration. In this configuration, the display unit 113 can display a first output screen in the first region 113a that is exposed, and, as shown in FIG. 5a, can output a standby screen indicating date and time in the first region 113a. Further, as shown in FIG. 5b, if the user inputs information by manipulating the second manipulation unit 123, the corresponding information can be displayed in the first region 113a of the display unit 113.

As shown in FIGS. 6a and 6b, if the mobile terminal 100 is in an open configuration, a second output screen can be displayed in the first and second regions 113a and 113b of the display unit 113. In this configuration, if the first output screen has a lateral output direction, the second output screen may have a longitudinal output direction. Alternatively, the first and second output screens can both have a lateral output direction. In fact, many different combinations of output directions can be provided.

The mobile terminal 100 may be configured to provide various multimedia functions, such as the capturing of photos or videos and the reception of broadcasting, in the open configuration. If the above functions are operated when the second region 113b is uncovered, the user is provided a larger sized output screen. In addition, as shown in FIG. 6a, when the second body 120 is moved to an open configuration from a closed configuration, menus, icons, and the like for operating the functions of the capturing of photos or videos, transmitting/receiving video calls, and the receiving of broadcasts can be displayed in the first and second regions 113a and 113b of the display unit 113. Alternatively, when the user moves the second body 120 to an open configuration, the menus or icons can be automatically displayed on the display unit 113.

When the user selects one of the menus or icons, corresponding visual information is outputted to the display unit 113. For example, as shown in FIG. 6b, when the user selects the menu or icon related to a Digital Multimedia Broadcast (DMB) function, the DMB is outputted to the display unit 113. If the display unit 113 is implemented in the form of a touch screen, the user can execute the corresponding function by touching the menu or icon displayed on the display unit 113. Further, the user can execute the corresponding function by manipulating the first and second manipulation units 116 and 123 and selecting the menu or icon.

Figure 7:
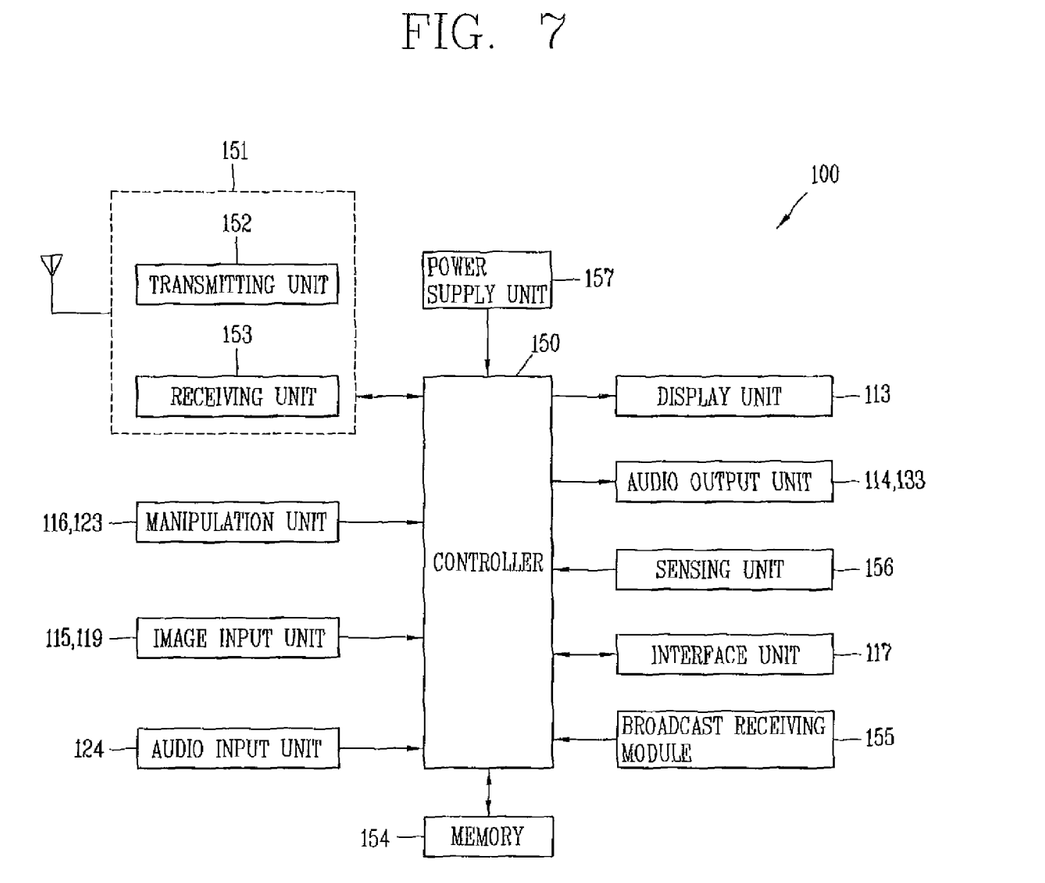
FIG. 7 is a block diagram of a mobile terminal according to an exemplary embodiment of the present invention.

As shown in FIG. 7, the mobile terminal 100 according to the exemplary embodiment of the present invention includes a wireless communication module 151, manipulation units 116 and 123, image input units 115 and 119, an audio input unit 124, a display unit 113, audio output units 114 and 133, a sensing unit 156, an interface 117, a broadcast receiving module 155, a memory 154, a power supply unit 157, and a controller 150.

The controller 150 controls the general operation of the mobile terminal 100. For example, the controller 40 performs controlling and processing related to voice calling, data communication, video calling, or the like. In addition, the controller 150 controls the display unit 113 such that the display unit 113 may output a different screen according to the covering and uncovering of the second region 113b (see FIG. 2) of the display unit 113.

The wireless communication module 151 transmits/receives radio signals to/from a mobile communication base station via an antenna. For example, the wireless communication module 151 handles transmission/reception of audio data, text data, video data, and control data under the control of the controller 150. The wireless communication module 151 also includes a transmitting unit 152 that modulates a signal to be transmitted and transmits the modulated signal and a receiving unit 153 that demodulates a received signal.

The image input units 115 and 119 process an image frame such as a still image or video obtained by an image sensor during a video calling mode or in an image capturing mode.

The processed image frame may be converted into image data that can be displayed on the display unit 113 and then outputted to the display unit 113. The image frame processed by the image input units 115 and 119 may be stored in the memory 154 or transmitted via the wireless communication module 153 under the control of the controller 150.

The audio input unit 124 receives an external audio signal in a calling mode, recording mode, voice recognition mode, and the like, and converts the audio signal into electrical voice data. In the calling mode, the processed voice data may be converted into a format transmittable to the mobile communication base station via the wireless communication module 151 and outputted to the wireless communication module 151. In the recording mode, the processed voice data is outputted so as to be stored in the memory 154. The audio input unit 124 may include assorted noise canceling algorithms to cancel noise generated in the course of receiving the external audio signal.

The display unit 113 displays and outputs information processed in the mobile terminal. For example, when the mobile terminal is in a calling mode, the display unit 113 displays a User Interface (UI) or a Graphic User Interface (GUI) related to a call under the control of the controller 50. When the mobile terminal is in a video calling mode or an image capturing mode, the display unit 113 may display a captured/received image, UI, and/or a GUI under the control of the controller 150. If the display unit 113 includes a touch screen, the display unit 113 may be also used as an input unit as well as the output unit. Further, the display unit 113 may be configured to display screens of different sizes, such as a first output screen and a second output screen according to the open configuration or closed configuration of the mobile terminal 100 (see FIGS. 5a to 6b).

The manipulation units 116 and 123 may be configured as shown in FIG. 1 to provide key input data inputted by the user to the controller 150 to control the operation of the terminal. The manipulation units 116 and 123 may be operated as a hot key for switching a screen displayed on the display unit 113 between the first and second output screens.

The audio output units 114 and 133 converts audio data which has been received from the wireless communication module 151 in a call signal reception mode, a calling mode, a recording mode, a voice recognition mode, a broadcast reception mode, or the like, under the control of the controller 150, or audio data which has been stored in the memory 154 and outputs it externally. In addition, the audio output units 114 and 133 output an audio signal related to a function (e.g., a call signal reception sound, a message reception sound, or the like.) performed by the mobile terminal 100.

The sensing unit 156 senses a current state of the mobile terminal such as a location of the mobile terminal 100, or whether the mobile terminal is being touched by the user, and generates a sense signal for controlling the operation of the mobile terminal 100. For example, the sensing unit 156 handles a sensing function as to whether or not the power supply unit 157 supplies power or whether or not the interface 117 is combined with an external device. Further, the sensing unit 156 senses the covered and uncovered configurations of the second region 113b of the display unit 113. That is to say, the sensing unit 156 senses whether the mobile terminal 100 is in the open or closed configuration and outputs the sensing result to the controller 150. According to the sensing result, the controller 150 controls the display unit 113 to display the first or second output screen.

The interface 117 serves to interface with external devices to be connected with the mobile terminal. For example, the external devices may include a wired/wireless headset, an external charger, a wired/wireless data port, a card socket (e.g., for coupling a memory card, a SIM/UIM card), and the like. The interface 117 may receive data from the external device or be provided with power and transfer the received data or power to each element of the mobile terminal. The interface 117 may also transmit internal data of the mobile terminal to an external device.

The memory 154 may store a program for processing and controlling the mobile terminal 100 performed by the controller 150, and may also perform a function for temporarily storing inputted or outputted data (e.g., a phone book, a message, a still image, or video, or the like). In addition, the memory 154 may store a program for controlling an operation of the mobile terminal. The memory 154 may include a storage medium of at least one of a hard disk type memory, a card type memory (e.g., an SD or XD memory, or the like.), a flash memory, a RAM, or a ROM.

The broadcast receiving module 155 may receive a broadcast signal transmitted through a satellite or terrestrial waves, convert it into a broadcast data format that can be outputted to the audio output units 114 and 133 and the display unit 113, and outputs the same to the controller 150. In addition, the broadcast receiving module 155 receives supplementary data (e.g., Electric Program Guide (EPG), a channel list, or the like) associated with a broadcast. The broadcast data converted in the broadcast receiving module 155 and the supplementary data may be stored in the memory 154.

The power supply unit 157 receives external or internal power and supplies power required for an operation of each element under the control of the controller 150.

As described above, the present invention increases the size of a display unit in a limited mounting space and provides a new opening and closing structure of a mobile terminal by forming a second body configured to cover one end of a first body having a display unit and slidably connecting the second body to the first body so as to cover and uncover some region of the display unit by movement of the second body.

Furthermore, the present invention provides a user with an improved multimedia environment by displaying an output screen of a different size on the display unit according to the opening and closing of the mobile terminal.

Furthermore, the present invention provides a mobile terminal of a new configuration by configuring the mobile terminal to have a bar type design and a slide type design, respectively, in an open configuration and in a closed configuration.

The above-explained mobile terminal is not limited to the configurations and methods of the embodiments described herein. However, the embodiments can be modified such that all or some of the embodiments may be selectively combined to make various modifications.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mobile terminal, comprising:
   a first body;
   a display having a first region and a second region, the display being located at the first body;
   a second body slidably connected to the first body, the second body being slideable between a first position that covers the second region and a second position that exposes the second region; and a battery cover detachably mounted to the first body for covering a battery mounted in the first body, wherein the first body includes a front surface, a rear surface opposite the front surface, a pair of side surfaces connecting the front surface to the rear surface, a top surface connecting the front surface to the rear surface, and a bottom surface connecting the front surface to the rear surface, the display unit being located at the front surface, wherein the second body is configured to cover a portion of the front, rear, and bottom surfaces of the first body, and wherein the battery cover is mounted at the rear surface of the first body and is not covered by the second body in the second position, thus to be substantially exposed;

wherein the second body comprises;

a front case located at the front surface of the first body so as to cover the second region when the second body is in the first position; and a rear case located at the rear surface of the first body, the rear case being connected to the front case.

2. The mobile terminal of claim 1, wherein the second body is configured to cover one end of the first body.

3. The mobile terminal of claim 2, wherein the second body is configured to expose the pair of side surfaces of the first body.

4. The mobile terminal of claim 1, wherein the second body includes a manipulation unit configured to input information.

5. The mobile terminal of claim 4, wherein the manipulation unit is a keypad including a plurality of key buttons arranged thereon.

6. The mobile terminal of claim 3, further comprising a slide module located between the first body and the front case, the slide module being configured to slidably connect the first body to the front case.

7. The mobile terminal of claim 3, further comprising a slide module located between the first body and the rear case, the slide module being configured to slidably connect the first body to the rear case.

8. The mobile terminal of claim 3, further comprising:
a first slide module located between the first body and the front case, the first slide module being configured to slidably connect the first body to the front case; and
a second slide module located between the first body and the rear case, the second slide module being configured to slidably connect the first body to the rear case.

9. The mobile terminal of claim 8, further comprising an elastic force unit connected between one of the first and second slide modules and the first body to provide semi-automatic sliding when the second body moves between the first and second positions.

10. The mobile terminal of claim 3, further comprising a guide unit configured to guide relative movement of the first and second bodies so as to constrain lateral movement between the first and second bodies during said relative movement of the first and second bodies.

11. The mobile terminal of claim 10, wherein the guide unit extends from one of the front and rear cases and is connected to the other one of the front and rear cases.

12. The mobile terminal of claim 11, wherein the first body includes at least one through slot, and the guide unit is configured to be inserted into the at least one through slot and is moveable therein.

13. The mobile terminal of claim 2, wherein the display unit is configured to display first output information in the first region when the second region is covered and to display second output information in the first and second regions when the second region is uncovered.

14. The mobile terminal of claim 13, wherein the second region extends from the first region, and the first region is exposed when the second body is in the first position.

15. The mobile terminal of claim 13, wherein the second output information includes one or more menus or one or more icons indicating the functions related to images displayed on the second output information.

16. The mobile terminal of claim 13, wherein images oriented in a transverse direction of the mobile terminal are displayed in the first region when the second region is covered, and images oriented in a longitudinal direction of the mobile terminal are displayed in the first and second regions when the second region is uncovered.

17. A mobile terminal, comprising:
a first body;
a display having a first region and a second region, the display being located at the first body;
a second body slidably connected to the first body, the second body being slideable between a first position that covers the second region and a second position that exposes the second region;
a controller configured to control the display unit such that display orientation of the display unit is changed when the second body slides from the first position to the second position; and
a battery cover detachably mounted to the first body for covering a battery mounted in the first body,
wherein the display unit is configured to display first output information in the first region when the second region is covered and display second output information in the first and second regions when the second region is uncovered,
wherein the first body includes a front surface, a rear surface opposite the front surface, a pair of side surfaces connecting the front surface to the rear surface, a top surface connecting the front surface to the rear surface, and a bottom surface connecting the front surface to the rear surface,
the display unit being located at the front surface,
wherein the second body is configured to cover a portion of the front, rear, and bottom surfaces of the first body, and
wherein the battery cover is mounted at the rear surface of the first body and is not covered by the second body in the second position, thus to be substantially exposed;
wherein the second body comprises:
a front case located at the front surface of the first body so as to cover the second region when the second body is in the first position; and
a rear case located at the rear surface of the first body, the rear case being connected to the front case.

18. The mobile terminal of claim 17, further comprising:
a first slide module located between the first body and the front case, the first slide module being configured to slidably connect the first body to the front case; and
a second slide module located between the first body and the rear case, the second slide module being configured to slidably connect the first body to the rear case.

* * * * *